F. OTTO.
Eaves-Trough.

No. 217,848. Patented July 22, 1879.

Witnesses:
L. Bacon
W. E. Chaffee

Inventor:
Ferdinand Otto
by B. C. Converse
Atty

UNITED STATES PATENT OFFICE

FERDINAND OTTO, OF SPRINGFIELD, OHIO.

IMPROVEMENT IN EAVES-TROUGHS.

Specification forming part of Letters Patent No. 217,848, dated July 22, 1879; application filed March 1, 1879.

*To all whom it may concern:*

Be it known that I, FERDINAND OTTO, of the city of Springfield, in the county of Clarke and State of Ohio, have invented certain new and useful Improvements in Eaves-Troughs, which improvements are fully, clearly, and exactly set forth in the following specification.

My improvement relates to sheet-metal eaves-troughs having a bead turned outwardly on both edges of the same, whereby the trough is made stronger and more durable, and a much neater finish is given to it.

Heretofore eaves-troughs of tin have been made with the bead in a separate piece and slipped on over the edge after the trough has been concaved. In some a single bead has been turned on the outside edge of the trough only; but in such cases the inner edge, which necessarily bears as much strain as the outer edge, is left without the requisite strength and stiffness, which a bead on both edges imparts thereto, causing the trough to twist and get out of shape and to bend when filled with water.

Figure 1:
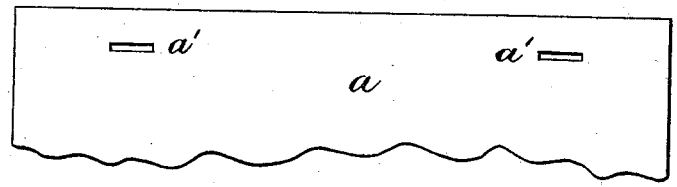

In constructing my improvement I first punch a series of oblong holes in each edge of the sheet, extending parallel therewith, on which the beads $b\ b$ are afterward turned. (See Fig. 1.) These holes are made exactly far enough from the edge to bring them, when the bead is turned, in line with its horizontal axis.

Figure 3:
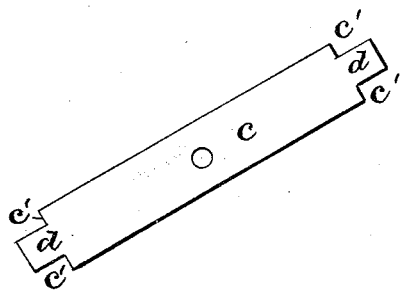
Figure 4:
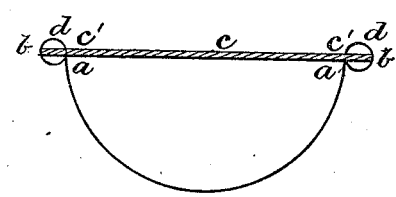

A stay, $c$, Fig. 3, constructed of a single piece of strap-iron, having a tenon, $d$, on each end, is inserted into the holes $a'$, (across the trough,) which are opposite each other, connecting the two beads together. The tenon $d$ is thus entirely concealed from view, so that the trough is not only very stiff and strong, as will be seen in Fig. 4, but either side of it can be turned outward in putting it up, which is sometimes a great advantage in uniting the sections.

Figure 2:
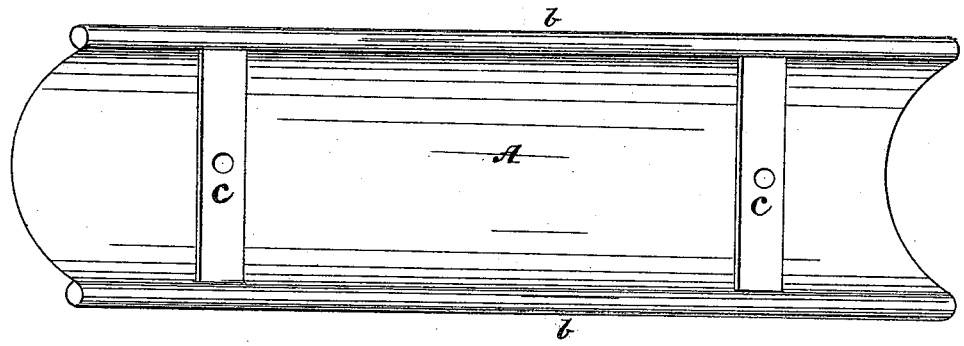

A is the finished trough, Fig. 2. The weight of the trough would be sustained without soldering in the cross-stays; but I prefer fastening them into the beads.

I am aware that tenoned stays are not new, and I do not claim them; also that a bead has been formed upon one side of a trough and a hole for the stay inserted under the bead; but as the tenon is necessarily exposed to view it mars the finish of the eaves-trough.

I claim as my improvement—

1. An eaves-trough, A, having beads $b\ b$ turned outwardly upon both edges of the same, and provided with holes $a'$ on the inside, extending into said beads in line with the horizontal axes thereof, for the insertion of a cross-stay, $c$, to connect the two beads together, substantially as hereinbefore set forth.

2. The combination, in an eaves-trough having a bead turned outwardly upon each of its edges, and provided with holes extending from the inside into said beads, as herein specified, of the cross-stay $c$, with the holes $a'$, and beads $b\ b$, as and for the purpose set forth.

FERDINAND OTTO.

Attest:
B. C. CONVERSE,
GEORGE KOEPGE.